(12) United States Patent
Petrus et al.

(10) Patent No.: US 9,130,879 B2
(45) Date of Patent: Sep. 8, 2015

(54) METHODS AND SYSTEMS FOR OFFLOAD PROCESSING OF ENCAPSULATED PACKETS

(75) Inventors: Margaret Petrus, San Jose, CA (US); Pradeep Kankipati, San Jose, CA (US); Mallik Mahalingam, Cupertino, CA (US)

(73) Assignee: VMWARE, INC., Palo Alto, CA (US)

( * ) Notice: Subject to any disclaimer, the term of this patent is extended or adjusted under 35 U.S.C. 154(b) by 244 days.

(21) Appl. No.: 13/594,568

(22) Filed: Aug. 24, 2012

(65) Prior Publication Data

US 2014/0056151 A1    Feb. 27, 2014

(51) Int. Cl.
*H04L 12/931* (2013.01)
*H04L 29/06* (2006.01)

(52) U.S. Cl.
CPC ............... *H04L 49/70* (2013.01); *H04L 69/22* (2013.01); *H04L 2212/0025* (2013.01)

(58) Field of Classification Search
CPC ....... H04L 1/00; H04L 29/0653; H04L 45/00; H04L 69/16; H04L 69/22; H04L 69/161; H04L 49/70; H04L 12/4633
USPC ........... 370/389, 392, 419, 463, 474; 709/230
See application file for complete search history.

(56) References Cited

U.S. PATENT DOCUMENTS

| | | | | |
|---|---|---|---|---|
| 6,618,397 B1* | 9/2003 | Huang | ........................... | 370/474 |
| 8,428,087 B1* | 4/2013 | Vincent | ........................ | 370/474 |
| 8,489,670 B1* | 7/2013 | Fletcher et al. | ............... | 709/203 |
| 2002/0120761 A1* | 8/2002 | Berg | .............................. | 709/230 |
| 2003/0195973 A1* | 10/2003 | Savarda | ........................ | 709/230 |
| 2004/0218623 A1* | 11/2004 | Goldenberg et al. | ......... | 370/463 |
| 2005/0220091 A1* | 10/2005 | LaVigne et al. | .............. | 370/389 |
| 2008/0225875 A1* | 9/2008 | Wray et al. | ................... | 370/419 |
| 2011/0090920 A1* | 4/2011 | Makineni et al. | ............. | 370/463 |
| 2012/0099591 A1* | 4/2012 | Kotha et al. | ................... | 370/392 |
| 2012/0250686 A1 | 10/2012 | Vincent et al. | | |

OTHER PUBLICATIONS

Mahalingam, Dutt et al., "VXLAN: A Framework for Overlaying Virtualized Layer 2 Networks over Layer 3 Networks," Aug. 22, 2012.
Cisco, "Scalable Cloud Networking with Cisco Nexus 1000V Series and VXLAN," Mar. 2012.

* cited by examiner

*Primary Examiner* — Brian D Nguyen
*Assistant Examiner* — Toan Nguyen

(57) ABSTRACT

Methods and systems described herein facilitate offload processing of encapsulated packets. A virtualization manager enables a virtual switch to be associated with a virtual overlay network. A virtual machine includes a virtual NIC that is connected to the virtual overlay network via the virtual switch. The virtualization manager is configured to encapsulate an outgoing packet sent from the virtual machine to the virtual overlay network. The virtualization manager is also configured to de-encapsulate an incoming packet sent from the virtual overlay network to the virtual machine. A physical NIC is configured to calculate at least one inner checksum based on the encapsulated outgoing packet and to verify at least one inner checksum included in the de-encapsulated incoming packet.

20 Claims, 3 Drawing Sheets

METHODS AND SYSTEMS FOR OFFLOAD PROCESSING OF ENCAPSULATED PACKETS

BACKGROUND

Virtual machines, which are an abstraction of physical computing resources, may communicate with other virtual machines using a network. The network may be a virtual network, which is an abstraction, or virtualization, of a physical network. Virtual networks may operate as layer two in the OSI model between and among virtual machines. Unlike physical networks, virtual networks are not constrained by physical links and topology. One such virtual network is a Virtual Extensible LAN (VXLAN), as described in the white paper titled "Scalable Cloud Networking with Cisco Nexus 1000V Series Switches and VXLAN", which is filed herewith and is incorporated by reference in its entirety.

Some physical network interface cards (NICs) are capable of performing operations on network data, such as checksum offload (CKO), TCP segmentation offload (TSO), and large receive offload (LRO). Computer systems with such offload-capable physical NICs are able to offload these operations from processors, which may decrease the load on the computer system processors and increase the performance of the computer system networking Virtual networks and other overlay networks may use packet encapsulation to place inner packets inside outer packets that are sent via physical networks. Physical NICs may be unaware of encapsulated packets and may not be able to process both the outer and inner packets thereof. As a result, additional processing by the computer system may occur, since packet processing cannot be offloaded to the physical NIC for encapsulated packets. Accordingly, there is a need for encapsulation-aware NICs that can understand and process encapsulated packets. Moreover, there is hence a need for a virtual machine host to be capable of offloading encapsulated packet processing to an encapsulation-aware NIC.

SUMMARY

Methods and systems described herein facilitate offload processing of encapsulated packets. A virtualization manager provides a virtual switch associated with an overlay network. A virtual machine includes a virtual NIC that is connected to the virtual network. The virtual switch is configured to encapsulate an outgoing packet sent from the virtual machine. The virtual switch is also configured to de-encapsulate an incoming packet destined to the virtual machine. A physical NIC is configured to calculate at least one checksum based on the encapsulated outgoing packet and to verify at least one checksum included in the de-encapsulated incoming packet.

DETAILED DESCRIPTION

Figure 1:
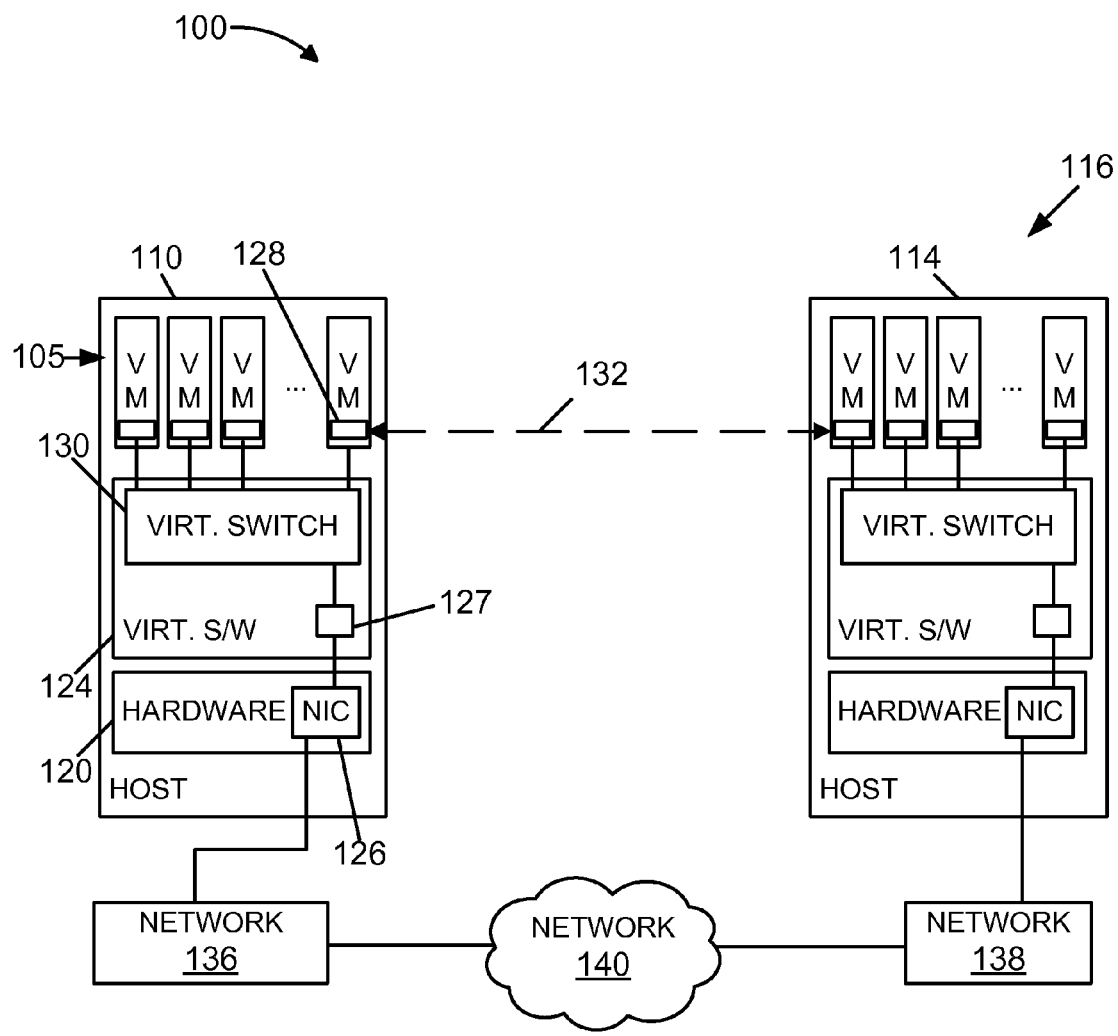
FIG. 1 is a block diagram of an exemplary virtual infrastructure having a virtual network.

FIG. 1 is an exemplary virtual infrastructure 100 having distributed virtual networking and a plurality of virtual machines (VMs) 105 on physical computer systems, or hosts, 110 and 114, collectively known as a cluster 116. Each VM 105 provides a virtual environment wherein a guest operating system (not shown) may reside and operate. Each physical computer 110 and 114 includes hardware 120, a virtualization software or manager 124 running on hardware 120, and one or more VMs 105 executing on the hardware 120 by way of virtualization software 124. The virtualization software 124 is therefore logically interposed between, and interfaces with, the hardware 120 and the VMs 105. The virtualization software 124 may be implemented wholly or in part in hardware, such as, a system-on-a-chip, firmware, a field programmable gate array (FPGA), etc. The hardware 120 includes at least one processor (not shown), wherein each processor is an execution unit, or "core," on a microprocessor chip. The hardware 120 also includes a system memory (not shown), which may include a general volatile random access memory (RAM), a network interface port (NIC) 126, a storage system (not shown), and other devices. The NIC 126, sometimes referred to as a physical NIC, may be an Ethernet network interface or similar interface. The virtualization software 124 may communicate with the NIC 126 using a device driver 127.

Virtualization software 124 is sometimes referred to as a hypervisor and includes software components for managing hardware resources and software components for virtualizing or emulating physical devices to provide virtual devices, such as virtual disks, virtual processors, virtual network interfaces, etc., for each VM 105. In the exemplary embodiment, each VM 105 is an abstraction of a physical computer system and may include an operating system (OS), such as Microsoft Windows® and applications, which are referred to as the "guest OS" and "guest applications," respectively, wherein the term "guest" indicates it is a software entity that resides within the VM. Microsoft Windows® is a registered trademark of the Microsoft Corporation of Redmond, Wash.

Each VM 105 may include one or more virtual NICs 128 that are coupled to a virtual switch 130. The virtualization software 124 provides and manages at least one virtual switch 130. One or more ports or interfaces (not shown) of each virtual switch 130 in hosts 110 and 114 may be logically grouped together to form a virtual network 132, such that one or more virtual NICs 128 are networked together via the virtual network 132. The virtual network 132 is an abstraction of a physical network and may provide a virtual layer two, or a data link layer, including services such as encapsulation of network layer data packets into frames, frame synchronization, and media access control, among other things. The virtual network 132 may span one or more physical networks and may be organized independent of the underlying physical topology and organization of the physical networks. Thus, virtual network 132 may be referred to as an overlay network, and the two phrases are used interchangeably herein. In the exemplary embodiment, virtual network 132 spans a first network 136 that includes host 110 and a second network 138 that includes host 114. First and second networks 136 and 138, respectively, may be different subnets on the same physical network, connected via routers, a virtual private network (VPN), and/or switches (not shown). In the exemplary embodiment, first and second networks 136 and 138, respectively, may be networked via network 140, which may include the Internet. The virtual network 132 may be implemented using VXLAN, as described in "VXLAN: A Framework for Overlaying Virtualized Layer 2 Networks over Layer 3 Networks" by M. Mahalingam et al., dated Aug. 22, 2012, made available by the Internet Engineering Task Force, and incorporated herein by reference in its entirety.

In the exemplary embodiment, media access control (MAC) frames, such as Ethernet frames, from the virtual NICs 128 and that are destined for one or more endpoints on the virtual network 132 are encapsulated in user datagram protocol (UDP) packets for transmission across the physical networks 132 and/or 138. UDP packets may be further encapsulated in an IP packet that is further encapsulated in an Ethernet frame. The process of encapsulating data on the virtual network 132 for transmission on underlying physical networks 136 and/or 138 is referred to herein as "virtual encapsulation." Thus, data transmitted across the virtual network 132 may include the following headers: outer Ethernet header, outer IP header, outer layer 4 (i.e., UDP, TCP, etc.) header, virtual encapsulation header, inner Ethernet header, inner IP header, and inner layer 4 header.

In the exemplary embodiment, the NICs 126 are capable of processing data on the virtual network 132, sometimes referred to as virtual encapsulation processing. More particularly, in the exemplary embodiment, each NIC 126 may be capable of handling operations such as checksum offload (CKO), TCP segmentation offload (TSO), and large receive offload (LRO), among other things, on virtual network data that is transmitted using physical NICs 126. As explained in more detail herein, these operations are conducted by the NICs 126 in coordination with the virtualization software 124 in order to offload the operations from the virtualization software 124.

The virtualization software 124 is configured to determine whether an outgoing packet needs virtual encapsulation based on the virtual port configuration (i.e., whether the virtual port is part of virtual network 132). Virtual encapsulation is needed when the outgoing packet will need to traverse the virtual network 132 from one host to another. For example, if virtual encapsulation is not needed, the outgoing packet can be passed to the NIC 126 in normal fashion. The virtualization software 124 is further configured to determine whether the outgoing packet needs checksumming or TCP segmentation. If, for example, neither checksumming nor TCP segmentation is needed, the outgoing packet can be virtually encapsulated and passed to the NIC 126 in normal fashion.

If the NIC 126 is not capable of virtual encapsulation processing, the virtualization software 124 performs CKO and/or TSO on the outgoing packet before virtually encapsulating the outgoing packet. The outgoing packet is then sent to the NIC 126. In the exemplary embodiment, however, the NIC 126 is capable of virtual encapsulation processing and performs CKO and/or TSO, as appropriate instead of the virtualization software 124

In the exemplary embodiment, the virtualization software 124 virtually encapsulates the outgoing packet, which includes adding the virtual encapsulation header. If TSO is to be performed, the virtual encapsulation header is configured such that TSO processing on the NIC 126 does not require any outer header manipulation except for the last segment. More particularly, the do not fragment (DNF) bit is set in the outer IP header and the payload length includes the outer header plus the segmented frame length. A signal is generated and transmitted by the virtualization software 124 to the NIC 126 in association with the outgoing packet. The signal informs the NIC 126 of one or more header offsets such that the NIC 126 can perform check-summing for both outer and inner headers. More particularly, the signal may be a five-tuple hint that includes the outer IP header offset, the outer layer 4 header offset, the inner IP header offset, the inner layer 4 header offset, and the inner layer 4 header protocol. The NIC 126 is configured to receive the signal and to perform CKO and, if appropriate, TSO, based on the signal.

In the exemplary embodiment, the NIC 126 is configured to receive virtually encapsulated packets and perform one or more operations, such as checksum validation, LRO, and receive queue placement. The NIC 126 may perform operations on the virtually encapsulated packets based on whether it is capable of virtual encapsulation processing or not. The virtualization software 124 performs an initial configuration of the NIC 126 that includes providing receive queue filters for enabling the NIC 126 to place incoming virtually encapsulated packets in the receive queue of the appropriate destination VM 105. The receive queue filters each include a three-tuple that includes the MAC address of the VM 105 (i.e., the virtual NIC 128 of the VM 105), a virtual overlay network MAC address, and a virtual network ID.

The NIC 126 is configured to receive an incoming packet that is virtually encapsulated and perform checksum validation of the outer IP header, the inner IP header, and, if applicable, the outer layer 4 header and/or the inner layer 4 header. The NIC 126 also performs an LRO operation on the incoming packet if appropriate. The NIC 126 is further configured to determine a receive queue into which to place the packet based on the receive queue filters. If the incoming packet does not match any receive queue filter, the incoming packet is placed in the default receive queue for further processing by the virtualization software 124.

The device driver used by the virtualization software 124 to communicate with the NIC 126 determines if all checksums were validated by the NIC 126. If all checksums were validated, then the device driver generates a signal for communicating to the virtualization software 124 that hardware checksum validation has already occurred. The signal may include a bit that is set on the incoming packet. If UDP is used for either the outer or the inner packet, the corresponding checksums may be considered validated even if the checksum value is zero, as UDP check-summing is optional. The device driver places the incoming packet in the appropriate receive queue determined by the NIC 126.

The virtualization software 124 receives the incoming packet and determines, based on the signal, whether the NIC 126 performed checksum validation on the encapsulated packet. The virtualization software 124 may perform any checksum validation that was not performed by the NIC 126. In the exemplary embodiment, the NIC 126 has performed checksum validation on all appropriate headers, and the virtualization software 124 de-encapsulates the incoming packet and delivers the de-encapsulated incoming packet to the destination VM 105.

Figure 2:
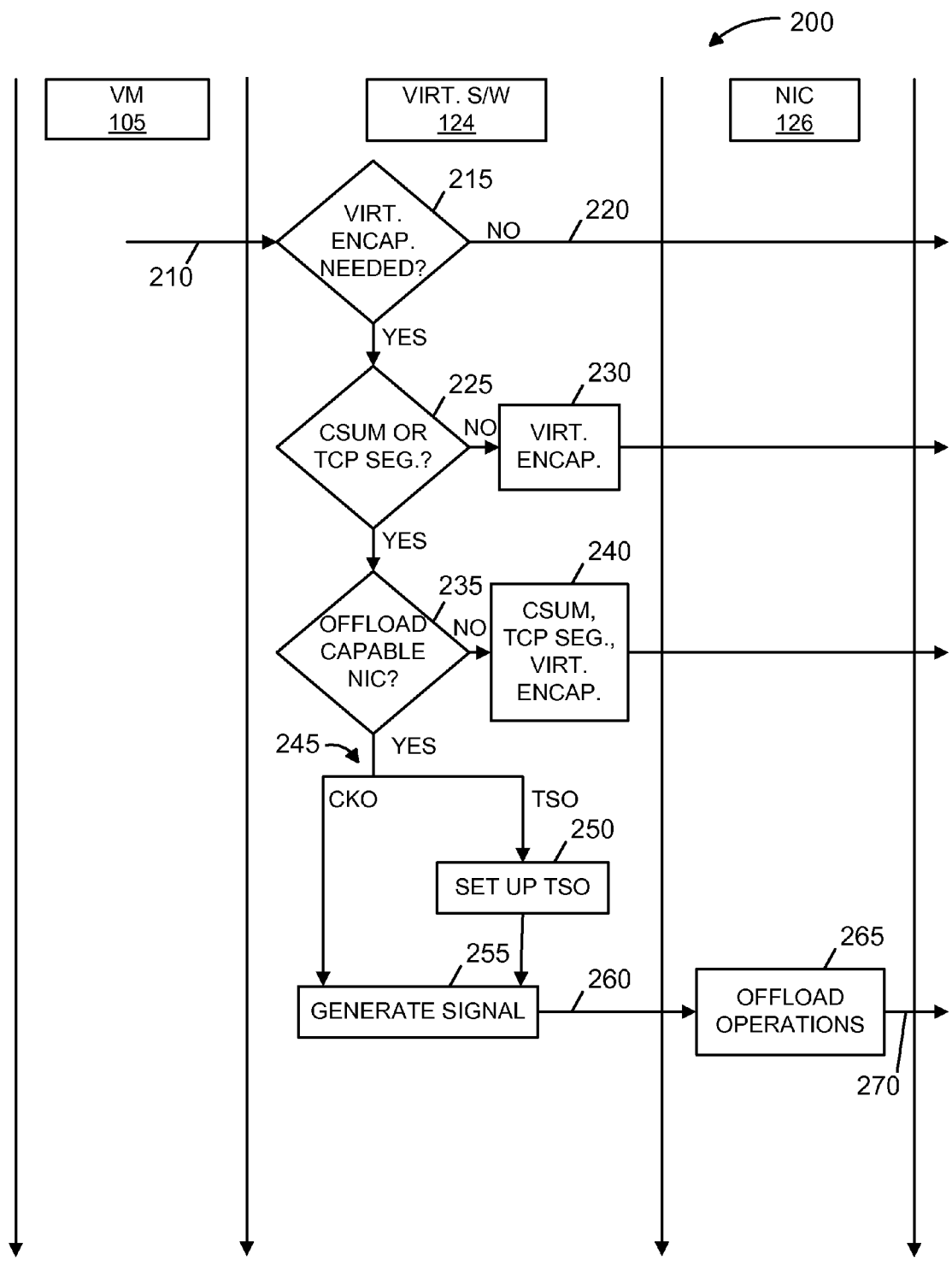
FIG. 2 is a swimlane diagram of an exemplary method for processing and transmitting encapsulated packets using exemplary physical NICs shown in FIG. 1.

FIG. 2 is a swimlane diagram of an exemplary method 200 for processing and transmitting virtually encapsulated packets using hardware NICs, such as NIC 126. In the exemplary method 200, data will be transmitted by host 110 (shown in FIG. 1) using a virtual network, such as the virtual network 132 (shown in FIG. 1), overlayed on one or more physical networks, such as networks 136, 138, and/or 140 (shown in FIG. 1).

In operation 210, VM 105 transmits a packet that is destined for the virtual network 132. The virtualization software 124 receives the packet and, in operation 215, determines whether virtual encapsulation is needed. Virtual encapsulation is needed for packets that traverse virtual network 132. The VM 105 may be unaware that the virtual network 132 is used to transport the packet. If virtual encapsulation is not needed, the packet is transmitted to NIC 126 in operation 220. If virtual encapsulation is needed, the virtualization software 124 determines, in operation 225, if either check-summing or TCP segmentation is needed for the packet. If neither check-summing nor TCP segmentation is needed, the virtualization software 124, in operation 230, virtually encapsulates the packet. As described herein, virtual encapsulation may include adding an additional or virtual encapsulation header and setting offsets that point to inner and/or outer packets.

If the virtualization software 124 determined, in operation 225, that either check-summing or TCP segmentation is needed, then the virtualization software 124 determines, in operation 235, whether the NIC 126 is capable of performing check-summing and TCP segmentation for virtually encapsulated packets. In other words, the virtualization software 124 determines if the NIC 126 is encapsulation offload capable. A NIC that is encapsulation offload capable may perform offload operations on regular packets as well as virtually encapsulated packets. Thus, an encapsulation offload capable NIC may be configured to process both outer and inner headers of virtually encapsulated packets.

If the NIC 126 is not encapsulation offload capable, the virtualization software 124 performs, in operation 240, check-summing and/or TCP segmentation on the packet. Further, in operation 240, the virtualization software 124 virtually encapsulates the packet. The virtualization software 124 may not perform check-summing on the outer packet of the virtually encapsulated packet and may instead allow the NIC 126 to perform offload check-summing (CKO) on the outer packet header. In operation 240, the virtualization software 124 transmits the virtually encapsulated packet to the NIC 126 for processing.

If the NIC 126 is encapsulation offload capable, as determined in operation 235, the virtualization software 124 may offload one or more operations, such as check-summing (CKO) and TCP segmentation (TSO), to the NIC 126. In operation 245, the virtualization software 124 virtually encapsulates the packet. If TSO is to be performed, the virtualization software 124, in operation 250, may set up the virtual encapsulation header such that TSO processing on the NIC 126 does not require outer header manipulation except for on the last segment. Operation 250 may include setting the do not fragment bit on the outer IP header and setting the payload length to include the outer header plus the segmented frame length for the segments to be generated by the NIC 126. During operation 245, the virtualization software 124, in operation 255, generates a signal that is used by the NIC 126 to process the virtually encapsulated packet. The signal may include a five-tuple, transmitted as a hint in a packet handle, that includes the outer IP header offset, the outer layer 4 header offset, the inner IP header offset, the inner layer 4 header offset, and the inner layer 4 protocol. The virtually encapsulated packet, with the signal, is transmitted to the NIC 126 in operation 260.

In operation 265, the NIC 126 receives the virtually encapsulated packet and the signal and performs one or more operations on the virtually encapsulated packet using the signal. For example, the NIC 126 may perform CKO on both the outer and inner headers of the virtually encapsulated packet. The CKO may be performed on both the outer and the inner headers for both the IP and the layer 4 headers, for a total of four checksum operations. In operation 270, the NIC 126 transmits the virtually encapsulated packet to the virtual network 132.

Figure 3:
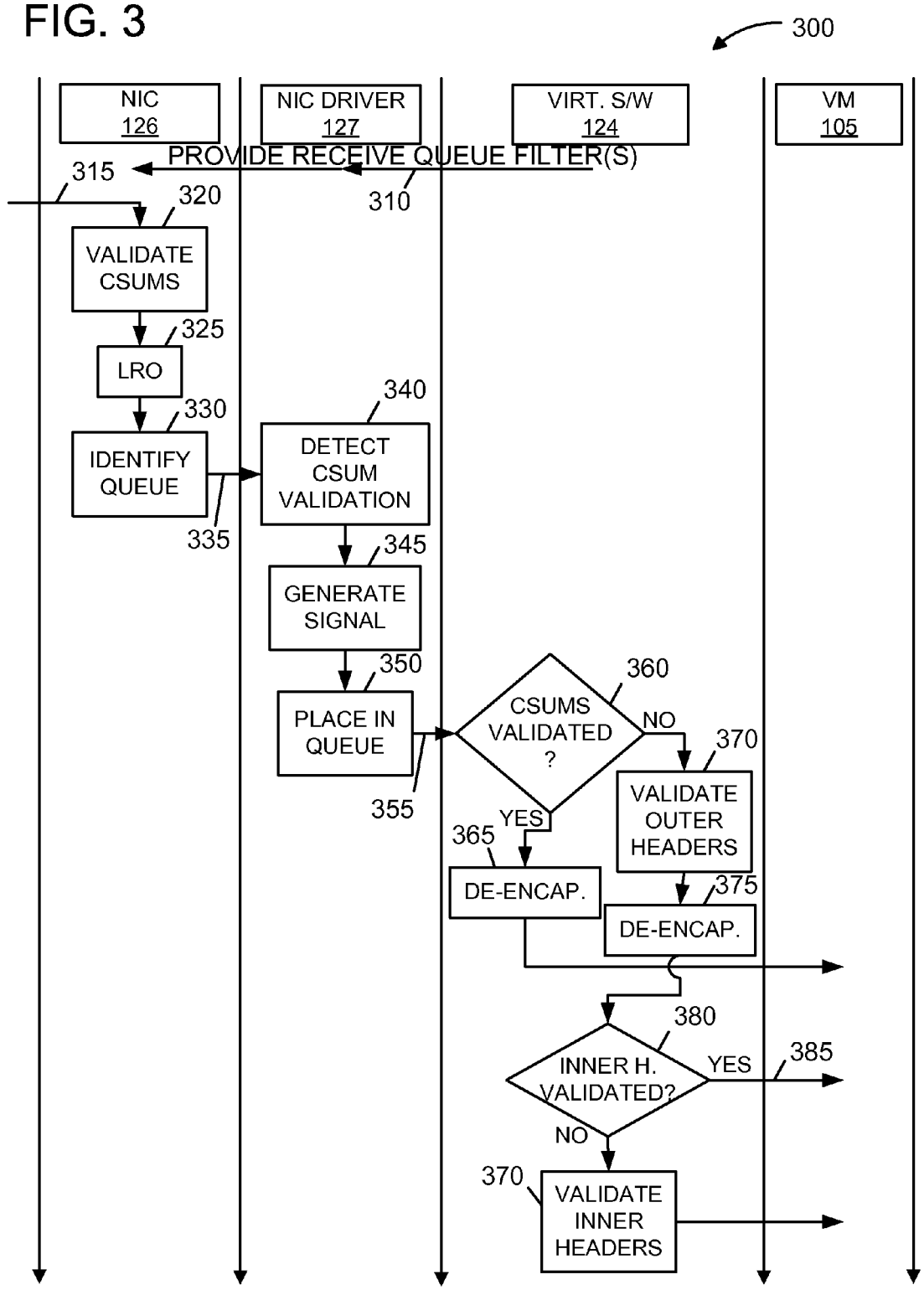
FIG. 3 is a swimlane diagram of an exemplary method for receiving and processing encapsulated packets using exemplary physical NICs shown in FIG. 1

FIG. 3 is a swimlane diagram of an exemplary method 300 for receiving and processing virtually encapsulated packets using hardware NICs, such as NIC 126. In the exemplary method 300, data will be received by host 110 (shown in FIG. 1) using a virtual network, such as the virtual network 132 (shown in FIG. 1), overlayed on one or more physical networks, such as networks 136, 138, and/or 140 (shown in FIG. 1). Host 110 may be used to implement method 200 and method 300 for sending and receiving virtually encapsulated packets.

In operation 310, the virtualization software 124 performs an initial configuration of the NIC 126 and the NIC device driver 127. If the NIC 126 is encapsulation offload capable, the configuration may include providing one or more receive queue filters, e.g., when traffic load increases, which may be used by the NIC 126 and the NIC device driver 127 to place incoming virtually encapsulated packets directly in the receive queue of the destination VM. The receive queue filter may be a three-tuple that includes a VM MAC address, an overlay network MAC address, and a virtual network ID. The filter applying performed in operation 310 may be performed when the receive load of the overlay network increases. Alternatively, or additionally, operation 310 may be performed each time the receive queue filters need to be updated, such as when a VM is powered on, when a VM is migrated to the host 110, or when the VM joins or leaves the virtual network 132.

In operation 315, the NIC 126 receives a virtually encapsulated packet from the virtual network 132. In operation 320, the NIC 126, which is encapsulation offload capable, validates the checksums in the virtually encapsulated packet. The virtually encapsulated packet may include four checksums: the outer IP header, the outer layer 4 header, the inner IP header, and the inner layer 4 header. In the exemplary embodiment, the outer layer 4 is UDP and so the outer layer 4 checksum may be omitted. In operation 325, the NIC 126 may perform LRO on the virtually encapsulated packet if needed. In operation 330, the NIC 126 may identify a receive queue for the virtually encapsulated packet based on the receive queue filter.

In operation 335, the NIC 126 sends up the virtually encapsulated packet with an indication of which checksums have been validated and an indication of the identified receive queue, if any. In operation 340, the NIC device driver 127 receives the virtually encapsulated packet and determines whether all checksums have been validated. As some layer 4 checksums are optional, such as in UDP packets, a layer 4 checksum of 0 may be considered validated if the checksum is optional. In operation 345, the NIC device driver 127 generates a signal that indicates to the virtualization software 124 which checksums have been validated. The signal may include bit settings in the virtually encapsulated packet to indicate which checksums have been validated by NIC. In operation 350, the NIC device driver 127 places the virtually encapsulated packet in the receive queue identified by the NIC 126. If the NIC 126 did not identify a receive queue, the virtually encapsulated packet may be placed in the default receive queue.

In operation 355, the NIC device driver 127 transmits or passes up the virtually encapsulated packet, with the signal, to the virtualization software 124. In operation 360, the virtualization software 124 determines whether, based on the signal, all checksums have been validated. If all checksums have been validated, the virtualization software 124, in operation 365, de-encapsulates the virtually encapsulated packet and transmits the de-encapsulated packet to the VM 105. Thus, because the NIC 126 performed checksum validation and, if applicable, LRO, the virtualization software 124 may avoid checksum validation and LRO for virtually encapsulated packets.

If the virtualization software 124 determined, in operation 360, that the outer headers (IP and layer 4) did not have validated checksums, the virtualization software 124, in operation 370, validates the outer checksums. In operation 375, if the validation of the outer headers was successful, the virtualization software 124 de-encapsulates the virtually encapsulated packet. If validation was not successful, the packet may be dropped. In operation 380, the virtualization software 124 determines whether the inner headers (IP and layer 4) were validated by the NIC 126. The virtualization software 124 may use the output of operation 360 or the signal generated by the NIC 126 to determine whether the inner headers were validated by the NIC 126. If the inner header checksums were validated, the virtualization software 124 transmits, in operation 385, the de-encapsulated packet to the VM 105. If the inner header checksums (i.e., the header checksums of the de-encapsulated packet) were not validated by the NIC 126, the virtualization software 124, in operation 390, validates the checksums of the de-encapsulated packet and transmits the de-encapsulated packet to the VM 105 if validation is successful. If checksum validation on the de-encapsulated packet is not successful, the de-encapsulated packet may be dropped.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware, or implemented with traditional virtualization or paravirtualization techniques. Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A virtual machine host comprising:
    a virtual machine that includes a virtual network interface (VNIC) connected to a virtual switch associated with an overlay network;
    virtualization software stored in a memory, the virtualization software configured to encapsulate an outgoing packet sent from the virtual machine to the overlay network, the virtualization software configured to enable a physical network interface (NIC) to perform an inner checksum by generating a signal that informs the physical NIC of at least one packet header offset associated with the encapsulated outgoing packet; and
    the physical network interface (NIC) configured to:
        receive the encapsulated outgoing packet from the virtualization software;
        receive the signal from the virtualization software;
        calculate at least one inner checksum based on the encapsulated outgoing packet and the received signal; and
        transmit the encapsulated outgoing packet towards a destination indicated by a header of the outgoing packet.

2. A virtual machine host in accordance with claim 1, wherein the physical NIC is further configured to calculate at least one outer checksum based on the signal and the encapsulated outgoing packet.

3. A virtual machine host in accordance with claim 1, wherein the physical NIC is further configured to perform transmission control protocol (TCP) segmentation on the encapsulated outgoing packet.

4. A virtual machine host in accordance with claim 1, wherein the virtualization software is logically interposed between the virtual machine and the physical NIC.

5. A virtual machine host in accordance with claim 1, wherein the physical NIC is further configured to:
   receive an encapsulated incoming packet from the overlay network; and
   verify at least one inner checksum that is included in the encapsulated incoming packet.

6. A virtual machine host in accordance with claim 5, wherein the physical NIC is further configured to:
   provide at least one receive queue filter that associates the virtual machine with the overlay network; and
   perform large receive offload on the encapsulated incoming packet.

7. A virtual machine host in accordance with claim 6, wherein the physical NIC is further configured to determine a receive queue for the encapsulated incoming packet based on the at least one receive queue filter.

8. A virtual machine host in accordance with claim 5, wherein the virtualization software is further configured to:
   receive the encapsulated incoming packet from the physical NIC;
   determine that the at least one inner checksum has been verified by the physical NIC;
   based on the verifying, de-encapsulate the encapsulated incoming packet; and
   transmit the de-encapsulated incoming packet to the virtual machine.

9. A computer-implemented method for transmitting encapsulated packets, the method comprising:
   receiving a packet from a virtual machine, wherein the packet is intended for a virtual network associated with the virtual machine;
   encapsulating, on the virtual network, the packet in an outer packet;
   enabling a physical network interface (NIC) to perform an inner checksum and an outer checksum by generating a signal that informs the physical NIC of at least one of an inner packet header offset and an outer packet header offset; and
   transmitting the outer packet and the signal from the virtual network to the physical NIC for check-summing.

10. A computer-implemented method in accordance with claim 9, wherein generating a signal comprises generating a signal that includes an outer internet protocol (IP) header offset, an outer layer four header offset, an inner IP header offset, an inner layer four header offset, and an inner layer four header protocol.

11. A computer-implemented method in accordance with claim 9, wherein encapsulating the packet in an outer packet comprises setting a do-not-fragment bit.

12. A computer-implemented method in accordance with claim 9, wherein the signal is a five-tuple hint.

13. A computer-implemented method in accordance with claim 9, wherein generating a signal comprises generating a signal that includes an outer internet protocol (IP) header offset and an inner IP header offset.

14. A computer-implemented method in accordance with claim 13, wherein the signal further includes an inner layer four header offset.

15. A computer-implemented method in accordance with claim 13, wherein the signal further includes an inner layer four header protocol.

16. A computer-implemented method in accordance with claim 13, wherein the signal further includes an outer layer four header offset.

17. A computer-implemented method for receiving encapsulated packets, the method comprising:
   receiving, by virtualization software stored in a memory, an encapsulated packet from a physical network interface (NIC), wherein the encapsulated packet includes a signal that indicates whether at least one inner checksum of the encapsulated packet is verified by the physical NIC;
   determining, by the virtualization software based on the signal, whether checksum verification is complete;
   de-encapsulating, by the virtualization software, the encapsulated packet if the checksum verification is complete; and
   transmitting the de-encapsulated packet to a virtual machine.

18. A computer-implemented method in accordance with claim 17, wherein receiving an encapsulated packet from a physical NIC comprises receiving a bit that indicates that at least one inner checksum of the encapsulated packet is verified.

19. A computer-implemented method in accordance with claim 17, further comprising providing at least one receive queue filter that associates the virtual machine with an overlay network, wherein providing at least one receive queue filter comprises providing a virtual machine media access control (MAC) address, an overlay network MAC address, and an overlay network identification.

20. A computer-implemented method in accordance with claim 19, further comprising determining a receive queue for the encapsulated packet based on the at least one receive queue filter.

* * * * *